310-14 SR

FIP8502 OR 3,739,204

United States Patent [19]

[11] 3,739,204

Sugawara et al.

[45] June 12, 1973

[54] INPUT SIGNAL GENERATING DEVICE

[75] Inventors: Noboru Sugawara; Takeshi Sawada, both of Tokyo, Japan

[73] Assignee: Canon Kabushiki Kaisha, Tokyo, Japan

[22] Filed: Mar. 6, 1972

[21] Appl. No.: 232,305

Related U.S. Application Data

[63] Continuation of Ser. No. 45,076, June 10, 1970, abandoned.

[52] U.S. Cl. .................................... 310/14, 310/15
[51] Int. Cl. .......................................... H02k 35/00
[58] Field of Search .................. 310/12, 13, 14, 15, 310/30

[56] References Cited

UNITED STATES PATENTS

| | | | |
|---|---|---|---|
| 3,065,366 | 11/1962 | Speiser et al. | 310/15 |
| 3,116,428 | 12/1963 | Blodgett et al. | 310/15 |
| 3,132,268 | 5/1964 | Abel et al. | 310/15 |
| 3,153,736 | 10/1964 | Etter | 310/15 |

*Primary Examiner*—George Harris
*Attorney*—Joshua Ward, Raymond J. McElhannon, Lorimer P. Brooks et al.

[57] ABSTRACT

An input signal generating device for computers comprises a plurality of keys arranged on the keyboard each of which keys has means responsive to the depression of the associated key for magnetically producing an input signal to operate the operation unit. The means for producing the input signal comprise a coil and a magnetic member one of which is responsive to the depression of the associated key. The relative movement of the magnetic member and the coil induces voltage across the coil as an input signal.

9 Claims, 20 Drawing Figures

Patented June 12, 1973 3,739,204

7 Sheets-Sheet 1

Patented June 12, 1973 3,739,204

7 Sheets-Sheet 2

INPUT SIGNAL GENERATING DEVICE

This is a continuation, of application Ser. No. 45,076 filed June 10, 1970, now abandoned.

The present invention relates to a signal generating device and more particularly to an input signal generating device for electronic computers.

The input signal generating device for electronic computers must be highly reliable in operation, but the conventional input signal generating device employs generally electromechanical contacts so that the erratic signals and damages tend to occur because of the failure, aging, attachment of foreign matters, etc., of the contacts.

It is therefore one of the objects of the present invention to provide an improved input signal generating device.

It is another object of the present invention to provide an improved input signal generating device employing no mechanical contacts.

It is a further object of the present invention to provide an improved input signal generating device of the type capable of generating electromagnetically the input signals upon depression of input keys.

It is a further object of the present invention to provide an improved signal generating device capable of generating a constant output voltage irrespective of a key stroking speed.

It is a further object of the present invention to provide an improved input signal generating device capable of generating a constant output voltage even when the key is depressed and remains at rest.

The above and other objects, features and advantages of the present invention will become more apparent from the following description of the preferred embodiments thereof taken in conjunction with the accompanying drawings in which.

Figure 1:
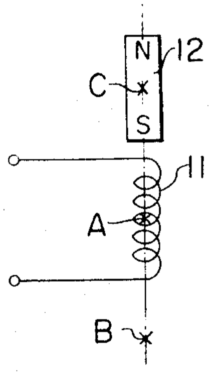
FIG. 1 is a view for explanation of electromagnetic induction.

Referring to FIG. 1, a coil 11 and a magnet 12 are arranged as shown and when the magnet or coil is moved relative to each other, the voltage induced across the coil 11 is given by $$V = -N\frac{d\phi}{dt} = -N\frac{d}{dt}\int^{B_n ds}$$

where $V$ = induced voltage;

$\phi$ = flux;

$N$ = number of turns of coil;

$S$ = sectional area of coil; and $B_n$ = flux density perpendicular to the cross section of coil. (MKS unit)

Figure 2A:
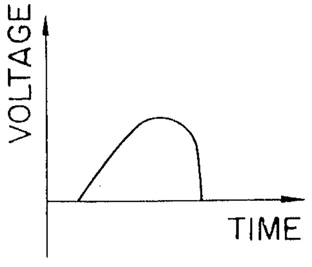
FIGS. 2A, 2B and 2C illustrate waveshapes of the induced voltage developed in the device shown in FIG. 1.
Figure 2B:
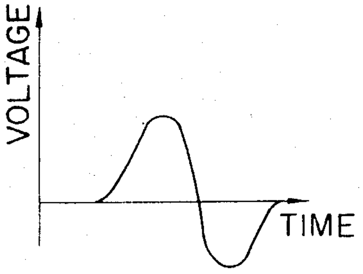
Figure 2C:
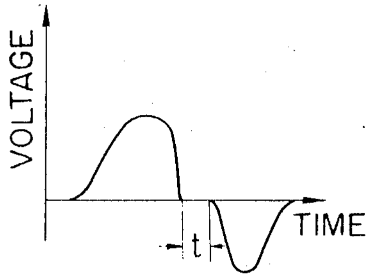

The waveform of the voltage thus induced varies depending upon the relative position of the magnet to the coil. That is, when the magnet 12 is inserted into the coil to the center A, the waveform as shown in FIG. 2A is obtained. The voltage has one polarity. The magnitude of the induced voltage is in proportion to the velocity at which the magnet 12 is inserted into the coil 11. The higher the velocity, the greater the induced voltage. FIG. 2B shows the waveform of the induced voltage when the magnet 12 passes through the coil 11. Until the magnet 12 reaches the point A, the positive voltage is induced and after it passes through the point A, the negative voltage is induced. FIG. 2C shows the waveform when the magnet 12 is entered into the coil to the point A, held in this position for a predetermined time $t$ and then withdrawn to the point C. That is, the positive voltage is induced until the magnet 12 reaches the point A; no voltage is induced during the time interval $t$; and the negative voltage is induced when the magnet 12 is withdrawn. So far the waveform of the induced voltage has been discussed with the reference point being A, that is the center of the coil 11, but when another point is selected as a reference point, the waveform of the induced voltage will be somewhat different from those illustrated in FIGS. 2A–2C. However, the patterns are same so that the relative position of the magnet 12 may be readily detected. For example, when the number of turns were 250; flux density, 800 gauss; flux, about 400 Maxwell; and the velocity of magnet, 50 cm/sec., the voltage of 500 mV was induced.

Since the voltage signal is obtained by varying the relative position of the magnet 12 to the coil 11, the voltage signal may be used as the input to an electronic computer or the like after it has been shaped.

According to the present invention, the keys of the electronic computer or the like are drivingly coupled to the magnet or coil so as to vary their relative position, thereby generating the input signals. However, the magnet and coil may be moved relative to each other. In the instant embodiment, the magnet is moved relative to the coil.

Figure 3A:
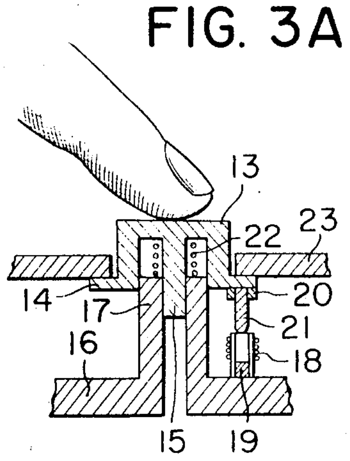
FIG. 3A is a sectional view of a first embodiment of the present invention.
Figure 3B:
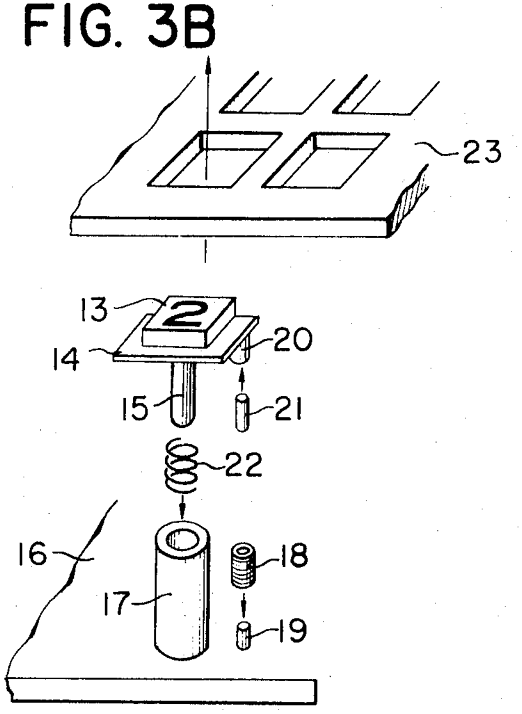
FIG. 3B is an exploded perspective view of the device shown in FIG. 3A.

FIG. 3A illustrates one embodiment of the input signal generating device in accordance with the present invention. A key 13 has a flange 14 formed along the lower side edges thereof. A mount 20 is formed in the flange 14 and a magnet 21 is fitted into this mount 20. A guide rod 15 extending from the center of the lower surface of the key top 13 is fitted into a guide cylinder 17 fixed to the base plate 16 in such a manner that the key 13 may be normally biased upwardly by means of a spring 22 interposed between the bottom of the key top 13 and the upper end of the cylinder 17. An air-core coil 18 is securely fixed in position by means of a projection 19 fixed to the base plate 16 in opposed relation with the magnet 21. It is seen that the upward movement of the key 13 is limited by its flange 14 which engages with the lower surface of a keyboard 23. The assembled input signal generating device is shown in FIG. 3A, and in this position the leading or lower end of the magnet 21 is slightly entered into the coil 18.

Figure 4:
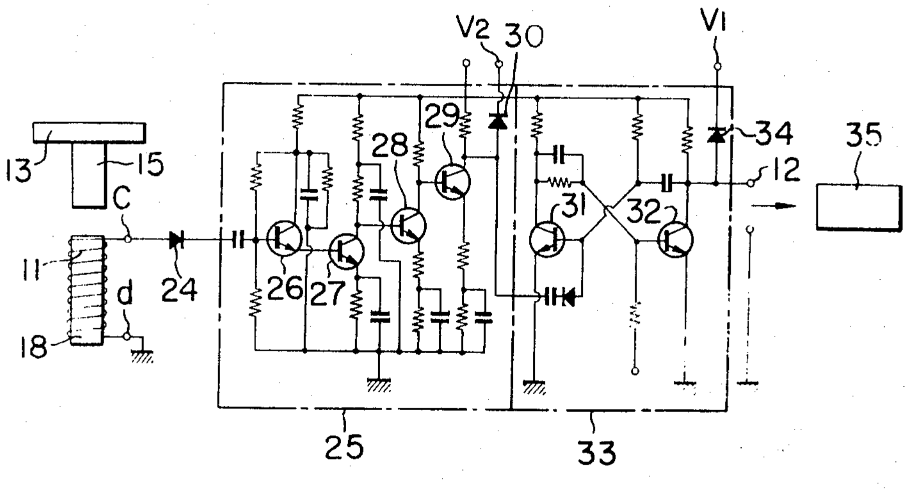
FIG. 4 is a circuit diagram of a waveform shaping circuit for feeding the pulses obtained from the input signal generating device shown in FIG. 3 to an operation unit of an electronic computer.
Figure 5:
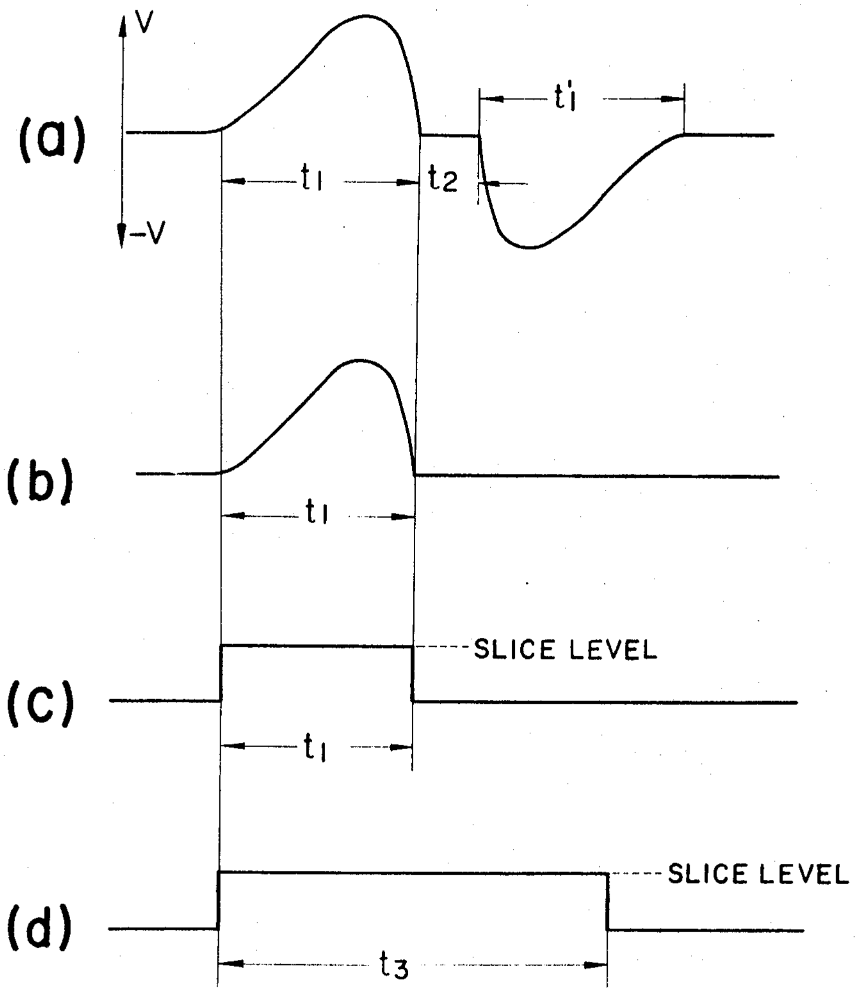
FIG. 5 illustrates the waveforms at various points of the circuit of FIG. 4.

When the key top 13 is depressed by a finger, the magnet 21 is entered into the coil 18, thereby inducing the voltage across the coil 18 as discussed hereinabove. In consequence, an input signal is derived. When the finger is released from the key top 13, it returns to its normal position under the force of the spring 22. In this case, the voltage having a waveform as shown in FIG. 5(*a*) is induced across the coil 18. The key 13 is depressed during the time interval $t_1$; it remains at rest during the time interval $t_2$; and it returns to its initial position during the time interval $t'_1$. Because of a diode 24 in FIG. 4, the negative voltage is eliminated while only the positive voltage remains as shown in FIG. 5(*b*). The positive voltage or pulse is amplified by an amplifier 25 in FIG. 4 and is sliced as shown in FIG. 5(*c*). The width of the pulse remains unchanged, but a rectangular pulse waveform is obtained. The amplifier 25 is of the conventional type including transistors 26, 27, 28 and 29 and the output of the amplifier is sliced by a diode 30 whose one end is connected to a terminal of a potential $V_2$.

The rectangular pulse thus obtained is applied to a monostable multivibrator 33 including transistors 31 and 32 so that it is converted into a signal having a pulse width of $t_3$, which is determined by the time constant of this circuit 33, and then sliced by a diode 34, whereby a pulse as shown in FIG. 5(*d*) is obtained. The thus obtained pulse may be applied to an operation unit 35 of an electronic computer as an input. In this case, the pulse width as well as its magnitude may be arbitarily determined by suitably selecting the time constant and the slicing voltage of the circuit.

In the instant embodiment, the magnet is movable and the coil is stationary, but it will be understood that the magnet may be stationary while the coil is made movable.

However, when a key is depressed at high speed, the induced voltage becomes greater while when a key is depressed at slow speed, the induced voltage becomes smaller. That is, depending upon the velocity of depressing the key, the induced voltage varies. This defect may be eliminated by a second embodiment as shown in FIG. 6, in which the induced voltage is maintained constant regardless of the velocity of depressing the key.

Figure 6A:
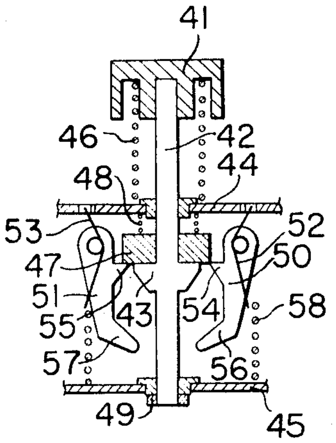
FIG. 6A is a sectional view in the normal condition of a second embodiment of the present invention for obtaining a constant output voltage irrespective of a key stroking rate.

Referring to FIG. 6A, a pin 42 extending from a key 41 has an inverted frustoconical member 43 which is interposed between upper and lower supporting plates 44 and 45. A magnet 47 is slidably fitted over the pin 42 above the frustoconical member 43. Between the lower surface of the supporting plate 44 and the upper end of the magnet 47 is interposed a spring 48 which is weaker than a spring 46 interposed between the key 41 and the upper surface of the supporting plate 44, so that the magnet 47 is normally biased downward. A stopper 49 is fixed to the leading end of the pin 42 so that the latter will not pull out of a hole in the lower supporting plate 45. On both sides of the frustoconical member are rotatably disposed cams 50 and 51 which are normally biased inwardly under the force of springs 52 and 53. When the frustoconical member 43 is moved upwardly the cams 50 and 51 are opened as shown in FIG. 6A so that the magnet 47 may be retained in position by means of stepped portions 54 and 55 of the cams 50 and 51. The leading portions of the cams 50 and 51 are bent inwardly as shown so that when the key is depressed and the frustoconical member 43 is moved downwardly, the latter engages with these inwardly bent portions 56 and 57, thereby opening the cams 50 and 51. Reference numeral 58 indicates a coil.

Figure 6B:
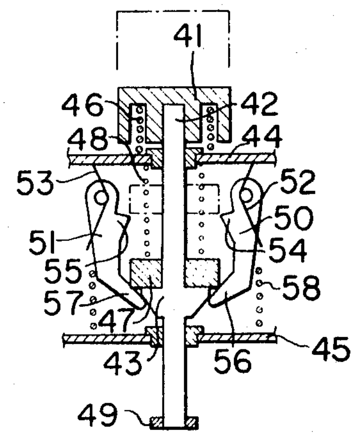
FIG. 6B is a sectional view in the key-depressed condition of the second embodiment shown in FIG. 6A.

Next the mode of operation will be described. Upon depression of the key 41, the frustoconical member 43 moves downward but it does not engage with the inwardly bent portions 56 and 57 yet so that the cams 50 and 51 remain closed. That is, the magnet 47 is supported in position by the stepped or engaging portions 54 and 55 as shown in FIG. 6A. When the frustoconical member 43 engages with the inwardly bent portions 56 and 57, the cams 50 and 51 are opened or moved outwardly so that the stepped or engaging portions 54 and 55 are also moved outwardly. In consequence, the magnet 47 is forced downwardly under the force of the spring 48 as shown in FIG. 6B. It is readily seen that the velocity of falling magnet may be determined only by the spring constant of the spring 48 and entirely independent of the velocity of depressing the key 41 so that the magnitude of the voltage induced across the coil 58 may be maintained constant all the time independently of the velocity of depressing the key 41. Thus, the variation in induced voltage may be prevented.

When the key 41 is released, it is returned to its normal position because the spring 46 is stronger than spring 48. In consequence, the magnet 47 is lifted to its normal position by the frustoconical member 43 and the cams 50 and 51 are also returned to their initial positions as shown in FIG. 6A when the frustoconical member 43 is disengaged from the inwardly bent portions 56 and 57.

The magnitude of the voltage induced in the second embodiment is maintained constant by the specific mechanical arrangement. The third embodiment has for its object to maintain constant the induced voltage by selecting a suitable magnetic material.

Figure 7A:
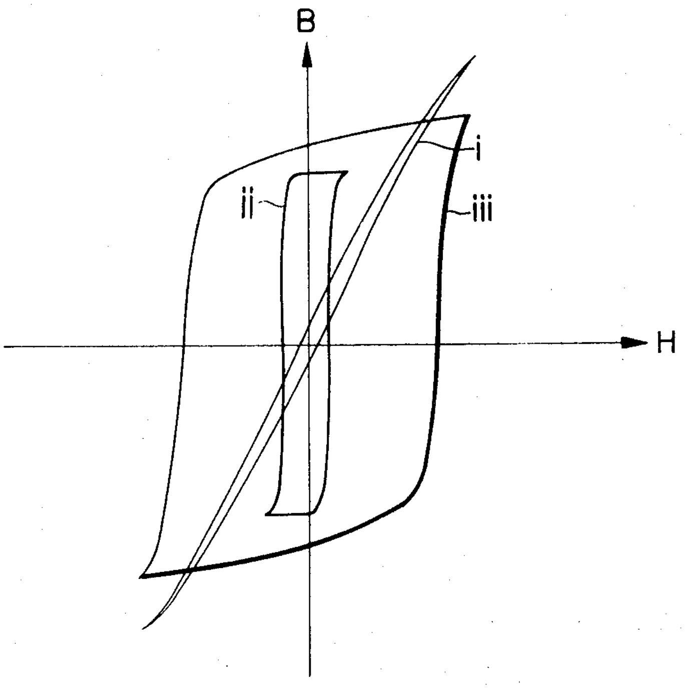
FIG. 7A shows B–H characteristic curves of various magnetic materials.

FIG. 7A shows the B–H curves of a soft magnetic material (i), a semi-hard magnetic material (ii) and a hard magnetic material (iii). In case of the soft magnetic material (i), the flux density B increases substantially linearly as the magnetizing force H is increased so that when the force H is removed, the flux density B immediately returns to zero. In case of the hard magnetic material (iii), the flux density B is increased as the force H is increased. After the flux density reaches the saturation point, it will not decrease to zero even when the magnetizing force H is removed. And only when the sufficient magnitude of the magnetizing force in the opposite direction is now applied, the negative density flux is obtained. That is, the flux density B may vary only when a relatively greater magnetizing force is applied. The semi-hard magnetic material (ii) is for example an alloy of cobalt (85 percent), beryllium (1.5 percent) and iron (13.5 percent) and has a hysteresis loop (ii) in FIG. 7A. It is seen that a relatively small magnetizing force H causes a rapid change in density flux B.

In the third embodiment, the semi-hard magnetic material having a hysteresis loop as shown at (ii) in FIG. 7A is utilized so that when the magnet is moved toward the semi-hard magnetic material by a predetermined distance, the rapid flux density is caused, thereby inducing a voltage as the output.

Figure 7B:
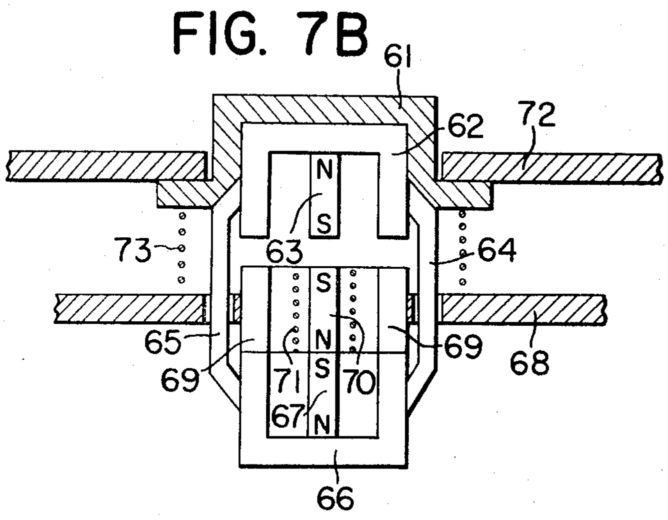
FIG. 7B is a sectional view of a third embodiment of the present invention for generating a constant output voltage irrespective of a key stroking speed.

Referring now to FIG. 7B, an inverted U-shaped soft magnetic material member 62 is securely fixed to the lower side of a key 61 and a magnet 63 is fixed at the center of the member 62. A U-shaped soft magnetic material member 66 is supported by two legs 64 and 65 extending downwardly from the upper soft magnetic material member 62. Thus, the upper and lower soft magnetic material members 62 and 66 are arranged in opposed relation as shown. A magnet 67 is fixed to the lower member 66 at the center thereof in opposed relation with the magnet 63. An intermediate soft magnetic material member 69 is securely fixed to a supporting plate 68 in opposed relation with the upper and lower members 62 and 66 and a semi-hard magnetic material member 70 is securely fixed at the center of the intermediate member 69 in opposed relation with the magnets 63 and 67. A coil 71 is wound around the magnet 70. A spring 73 is interposed between the lower surface of the key 61 and the upper surface of the supporting plate 68 so that the key 61 is normally biased upwardly as in the case of the first and second embodiments. In the normal position as shown in FIG. 7B, the upper surface of the lower member 66 is made in contact with the lower surface of the intermediate member 69 while the lower end of the magnet 70 is made in contact with the upper end or pole of the magnet 67 as shown in FIG. 7B. Reference numeral 72 depicts a keyboard. The three magnets 63, 70 and 67 are arranged with the poles N and S positioned as shown in FIG. 7B.

Upon depression of the key 61, the lower member 66 together with the magnet 67 is moved away from the intermediate member 69 and the magnet 70, while the upper member 62 and the magnet 63 move toward the intermediate member 69 and its magnet 70. When the former approaches the latter by a predetermined distance, the magnetic polarity of the semi-hard magnetic material member 70 is suddenly reversed. That is, the south pole S is reversed to the north pole so that the magnetic fluxes are changed, whereby a voltage is induced across the coil 71. Even when the key 61 is depressed further, no magnetic flux change occurs so that no voltage is induced.

Upon release of the key 61, it is returned to its normal position under the force of the spring 73, so that the magnet 63 is moved away from the semi-hard member 70. Simultaneously, the lower member 66 as well as the magnet 67 move toward the intermediate member 69 so that the magnetic polarity of the semi-hard magnetic member 70 is reversed again, whereby a voltage is induced across the coil 71 again. In the input signal generating device described hereinabove with reference to FIG. 7B, the magnitude of the induced voltage is rather dependent upon the position of the magnet 63 in which the magnetic polarity of the semi-hard magnetic member 70 is reversed, than dependent upon the velocity of depressing the key 61. In consequence, the magnitude of the induced voltage remains constant irrespective of the velocity of depressing the key 61.

In the above embodiments, the voltage is induced by varying the position of the magnet relative to the coil, thereby causing the flux density. Therefore, the voltage is induced only a relatively short time interval when the position of the magnet is changing relative to the coil. The important feature of the fourth embodiment is to provide constantly the output by electromagnetic induction by locating the magnet in a specific position relative to the coil.

Figure 8A:
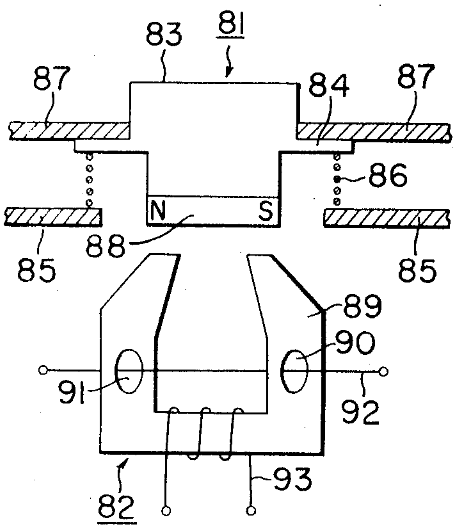
FIG. 8A is a sectional view of a fourth embodiment of the present invention for generating the output voltage by changing the position of a magnet relative to a magnetic core whose reluctance is periodically changed.

Referring to FIG. 8A, the input signal generating device of the fourth embodiment comprises first and second assemblies generally designated by 81 and 82 respectively. The first assembly 81 comprises a key 83, a magnet 88 fixed to the lower end thereof and a spring 86, which is interposed between the upper surface of a supporting plate 85 and the flange 84 of the key 83 so that the key 83 may be normally biased upwardly. The second assembly 82 comprises a U-shaped multihole magnetic core 89 made of a ferro-magnetic material such as ferrite and provided with two holes 90 and 91 formed symmetrically through both leg portions, a winding 92 passing through these holes 90 and 91 and an output winding 93. The winding 92 may be wound around the legs by the desired number of turns if necessary. The first assembly 81 is movable while the second assembly 82 is stationary.

Figure 9:
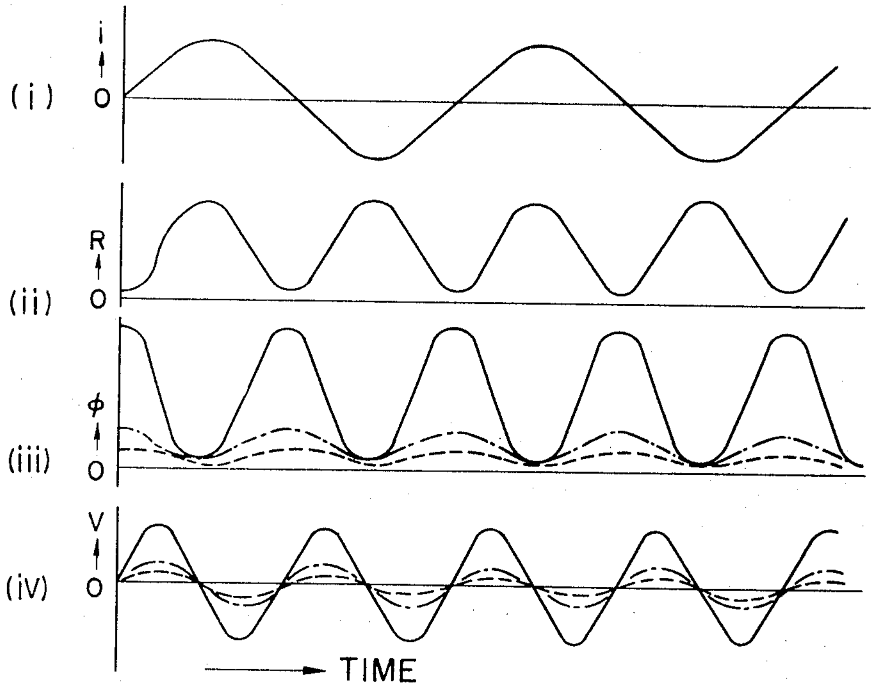
FIG. 9 illustrates waveforms of the current, reluctance, flux and output voltage of the device shown in FIG. 8.

When the exciting current $i$ of a frequency $f$ flows through the winding 92 so that the fluxes in the magnetic paths around the holes 90 and 91 may be sufficiently saturated periodically. In consequence, the reluctance of the main magnetic path (the portion around which the output winding 93 is wound) are varied in the vicinity of the holes 90 and 91 with a frequency of $2f$ as shown in FIG. 9(ii) so that when a predetermined flux is applied externally to the core 89, the flux in the main magnetic path varies as shown by the solid line in FIG. 9(iii). The solid and dot line curves indicate the flux when the externally applied flux is small.

Figure 8B:
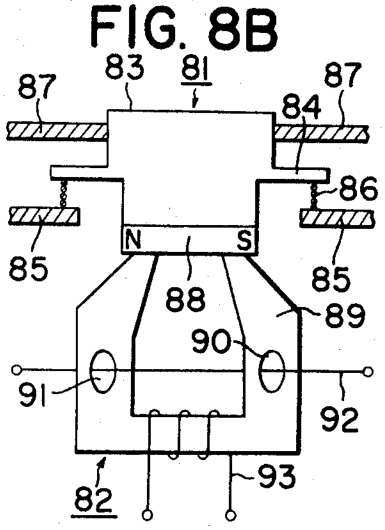
FIG. 8B is a view similar to FIG. 8A illustrating the key depressed.

Upon depression of the key 83, as shown in FIG. 8B, the magnet 88 is made in contact with the upper ends of the leg portions of the U-shaped core 89 so that the magnetic path through the core 89 is closed. In consequence, the substantial portion of the flux of the magnet 88 passes through the core 89 so that the voltage as shown in FIG. 9(iv) by the solid line is induced across the winding 93. In the fourth embodiment, the output voltage is produced as long as the magnet 88 is made in contact with the core 89. This is distinguished over the above embodiments.

Upon release of the key 83, the core 89 is spaced apart from the magnet 88 so that the external flux passing through the core 89 is greatly reduced as shown by the solid and dot line curves in FIG. 9(iii). In consequence, the voltage induced across the winding 93 is also small as shown by the solid and dot line curves in FIG. 9(iv).

When the magnet 88 bridges the air gap of the core 89, the magnetizing force having the constant magnetic polarity may be externally applied to the core 89 so that a predetermined magnetic flux is produced in the main magnetic path as discussed hereinabove. But its reluctance varies periodically as has been pointed above so that the flux which would have been constant is caused to vary in reverse proportion to the alternating reluctance. Therefore, the alternating output voltage may be derived. The output voltage induced when the magnet 88 is made in contact with the core 89 is exceedingly greater than that induced when the magnet is spaced apart from the core. It will be understood that the magnet is so arranged as to be spaced apart from the core when the key 83 is depressed so that the relationship between the depression of the key 83 and the output may be reversed as compared with the instant embodiment. The alternating output may be rectified and shaped so as to be applied to the operation unit.

In the instant embodiment, the magnet 88 is used as the flux source, but it may be also possible to locate the flux source within the core in such a manner that it may be displaced relative to the core when the key is depressed thereby inducing the voltage across the output winding in a similar manner as described hereinabove. The magnetic flux source may be a winding wound around the core so as to flow the direct current, thereby generating the flux in one direction.

The signals applied to electronic computers are desired to have a width or time interval longer than a predetermined time, but when an operator depresses and releases the key quickly in the input generating device of the fourth embodiment, the magnet is made in contact with the core only for a very short time so that the pulses having a relatively shorter width are applied to the operation unit. In this case, the unit cannot function correctly. The fifth embodiment to be described hereinafter may eliminate this defect.

Figure 10:
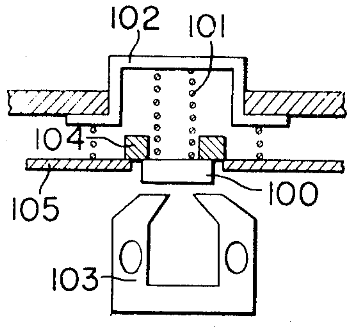
FIG. 10 is a sectional view of a fifth embodiment of the present invention which is a modification of the device shown in FIG. 8.

The input signal generating device illustrated in FIG. 10 is provided with a spring follower mechanism in order to eliminate the above mentioned defect. That is, a magnet 100 is fixed to a key 102 through a spring 101 and the stroke of the key is made longer than the spacing between the magnet 100 and a core 103. Upon depression of the key 102, the magnet 100 is made contact with the core 103 before the key 102 reaches its lower dead point. When the key 102 is depressed further, the spring 101 is compressed while the magnet 100 remains in contact with the core 103 until the key 102 reaches its dead point. Upon release of the key 102, first the key is moved upwardly but the magnet 100 is held in contact with the core 103 under the force of the spring 101 which is extended as the key 102 is moved upwardly. Only when the spring 101 is extended to a predetermined length, the magnet 100 is spaced apart from the core 103. Thus, the magnet 100 may be made in contact with the core 103 for a predetermined time interval irrespective of the velocity at which the key 102 is depressed and released.

In the fifth embodiment shown in FIG. 10, even when the magnet is spaced apart from a core, the small voltage is induced as shown by the solid and dot line curves in FIG. 9(iv). However, it is desired that this voltage is made as small as possible. For this purpose, a magnetic member 104 is fixed to a supporting plate 105 so that the magnet 100 is normally made in contact with the magnetic member 104 when the key 102 is not depressed, as shown in FIG. 10. Therefore, a substantial portion of the flux of the magnet 100 passes through the magnetic member 104 so that flux leakage may be minimized. Thus, the leakage flux from the core 103 may be minimized so that the voltage induced when the key is not depressed may be minimized as shown by the broken line curve in FIG. 9(iv). Even though the voltage induced when the key is depressed becomes slightly smaller than that induced in the fourth embodiment, the provision of the magnetic member 104 is advantageous because the voltage induced when the key is not depressed may be minimized as compared with the fourth embodiment.

Figure 11:
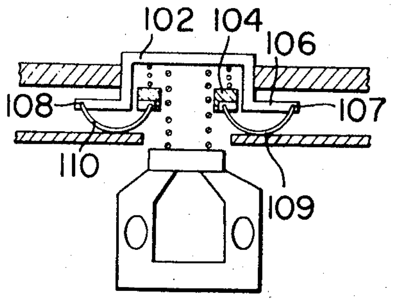
FIG. 11 is a sectional view of a sixth embodiment of the present invention which is a modification of the device shown in FIG. 11.

The sixth embodiment which is a modification of the fifth embodiment is directed toward the improvement of the magnetic member 104 which serves to minimize the voltage induced when the key is not depressed. (The spring follower mechanism is not modified). In short, the sixth embodiment is provided with a mechanism which spaces the magnetic member 104 away from the magnet 100 when the key 102 is depressed so that the decrease in the output voltage may be minimized. Arms 109 and 110 are pivotably fixed to the flange 106 of the key 102 at 107 and 108 and support the magnetic member 104, so that when the key 102 is depressed, the arms 109 and 110 serve to space the magnetic member 104 upwardly away from the magnet 100 as shown in FIG. 11, but make the magnetic member 104 in contact with the magnet 100 when the key 102 is not depressed. In the instant embodiment, the decrease in the voltage when the key is depressed may be made negligible because the magnetic member 104 may be spaced apart from the magnet by a greater distance when the key 102 is depressed.

In the above-described embodiments, only one key has been shown, but in practice a plurality of keys must be assembled into a keyboard of an input device. According to the present invention, such keyboard may be fabricated in a very simple manner.

Figure 12:
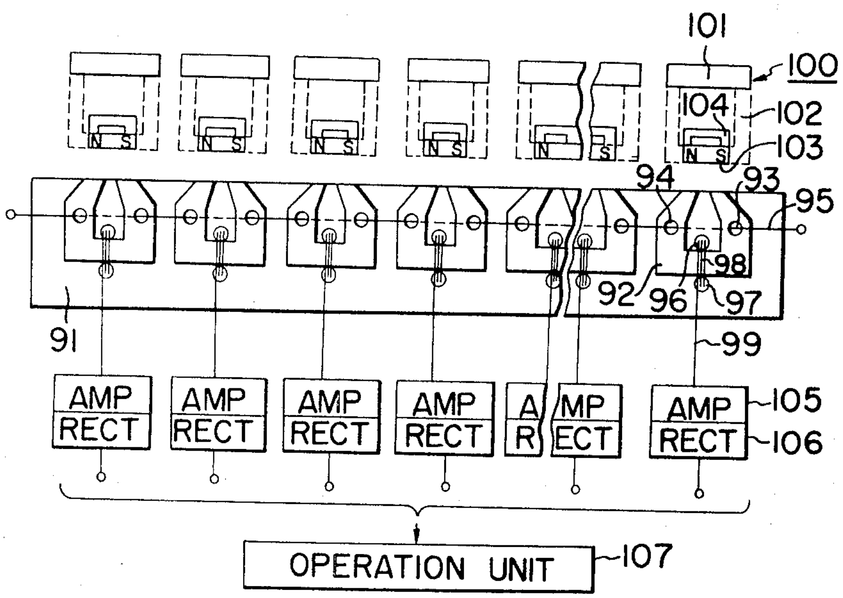
FIG. 12 is a diagrammatic view for explanation of an arrangement of a keyboard of the input signal generating device in accordance with the present invention.

Referring to FIG. 12, one example of a keyboard assembly in accordance with the present invention will be described. Upon a base or support 91 made of an insulating material is applied a coating of a magnetic material such as a ferrite or permalloy to a thickness of about 10 $\mu$ by the deposition techniques such as vacuum evaporation. Next by a suitable photoetching method, a plurality of U-shaped cores 92's are formed. More particularly, the magnetic coating is further coated with a resistant material which hardens on exposure to light. Next a mask is placed between a light source and the magnetic coating. In the areas not exposed to the light, the resistant material is dissolved and the underlying magnetic coating is removed by etching. It should be noted that the ends of each core 92 are aligned with the upper side edge of the support 91 as shown in FIG. 12. Holes 93 and 94 are formed through the magnetic coating and the base 91. A winding 95 is made to pass through these holes 93 and 94 so that the alternating current flows through this winding thereby changing the reluctance of each core 92 as in the case of the embodiment illustrated in FIG. 8. Openings 96 and 97 are formed through the support 91 on both sides of the base portion or main magnetic path of each core 92 and an output winding 98 is wound around the main magnetic path through these openings 96 and 97. The first assembly 100 corresponding to the first assembly 81 in FIG. 8A each including a key 101 and a magnet 103 is arranged in opposed relation with the each core or second assembly. Thus, the keyboard may be fabricated in a simple manner yet with a high degree of accuracy.

Figure 13B:
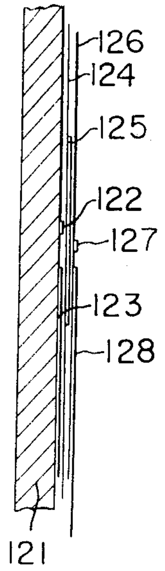
FIG. 13B is a side view illustrating the method of forming a magnetic core and its associated windings shown in FIG. 13A.
Figure 13A:
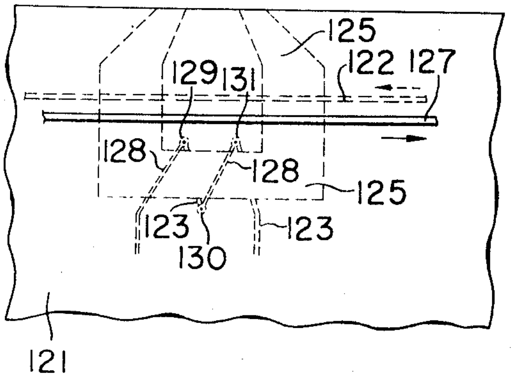
FIG. 13A is a front view of a core and associated windings fabricated by a thin film.

The core of the present invention is provided with the holes (90 and 91 in FIG. 8; and 93 and 94 in FIG. 12), but they may be eliminated when a pair of windings 122 and 127 are threaded through the opening of the core 125 as shown in FIG. 13A, so that the currents in opposite directions flow through them, thereby varying the reluctance in the leg portions of the core 125.

According to the present invention, the second assemblies may be formed all by printing. Referring to FIG. 13A, a winding 122 for flowing the excitation current is formed upon an insulating support 121 by vacuum deposition and photoetching technique. A lead 123 which is a part of the output winding is formed. Next, an insulating layer 124 (see FIG. 13B) is formed upon the support 121 and then a core 125 in the form of a thin film of a magnetic material is formed by deposition and photoetching technique. An insulating layer 126 (see FIG. 13B) is applied over the magnetic layer and then a lead 127 for flowing the excitation current is formed. Thereafter, a lead 128 which is a part of the output winding is formed so as to cross the lead 123. Next holes 129, 130 and 131 are formed at the crossings of the leads 123 and 128, and plated or fitted with pins, thereby electrically connecting the leads 123 and 128. In this case, the output winding of two turns is provided. Thus, the fabrication of the second assemblies is greatly simplified because the winding of excitation and output windings is not required.

What is claimed is:

1. A signal generating device comprising a magnetic member of semi-hard magnetic material having a polarity which is rapidly reversed in response to a variation of an external magnetic field and which is maintained after said external magnetic field is removed;

means for controlling said external magnetic field to reverse the polarity of said magnetic member; and means for sensing a change of flux in said magnetic member caused by the reversal of the polarity of said magnetic member.

2. A signal generating device as set forth in claim 1, in which said means for sensing a change of flux comprises coil means having a pair of output terminals, said coil means being disposed adjacent said magnetic member for directly sensing the change of flux caused by a said reversal of the polarity of said magnetic member, and for producing an electrical signal at said output terminals in response to said change of flux.

3. A signal generating device comprising a magnetic member which rapidly changes from one polarity state to the opposite polarity state in response to the application of the first external magnetic field of one directional sense, wherein said magnetic member maintains said opposite polarity state upon removal of said first external field, and wherein said magnetic member rapidly changes back to said one polarity state upon application of a second magnetic field of predetermined intensity and of a directional sense opposed to said one sense, and maintains said one polarity state upon removal of said second magnetic field, a pair of magnets for applying said first and second external magnetic fields, means for supporting said pair of magnets with a fixed spacing therebetween for simultaneous relative movement with respect to said magnetic member, wherein relative movement of said magnets in one direction with respect to said magnetic member produces a said change in polarity in said magnetic member from said one state to said opposite state, and relative movement of said magnets in the other direction with respect to said magnetic member produces a said change in polarity back to said one state; and an output winding disposed adjacent said magnetic member for sensing a change of flux caused by a said change of polarity of said magnetic member.

4. A signal generating device as set forth in claim 3, further comprising means for supporting said magnetic member in said fixed spacing between said pair of magnets.

5. A signal generating device as set forth in claim 3, further comprising means for supporting said magnetic member in said fixed spacing between said pair of magnets, and in which said pair of magnets are supported so that a pole of one magnet in said pair is opposed to a pole of the other magnet in said pair.

6. A signal generating device as set forth in claim 3, further comprising means for supporting said magnetic member in said fixed spacing between said pair of magnets, and in which said pair of magnets are supported so that a pole of one magnet in said pair is opposed to a pole of the other magnet in said pair, said magnetic member and output winding being fixedly mounted with respect to each other.

7. A signal generating device as set forth in claim 6, in which said output winding coaxially encompasses said magnetic member.

8. A signal generating device as set forth in claim 3, further comprising means for supporting said magnetic member in said fixed spacing between said pair of magnets wherein said magnetic member and pair of magnets extend along a common axis, and first, second and third magnetically conductive cylindrical elements disposed respectively in coaxial fixed relationships with said magnetic member and each of said magnets of said pair of magnets.

9. A signal generating device as set forth in claim 3, further comprising a key mounted for movement upon application of an external force, means for returning said key to a normal position upon removal of said external force, and means coupling said key to said pair of magnets wherein said magnets move in response to movement of said key.

* * * * *

UNITED STATES PATENT OFFICE
CERTIFICATE OF CORRECTION

Patent No. 3,739,204 Dated June 12, 1973

Inventor(s) Noboru Sugawara and Takeshi Sawada

It is certified that error appears in the above-identified patent and that said Letters Patent are hereby corrected as shown below:

Enter on page 1, [30] Foreign Application Priority Data

June 13, 1969 Japan................46545/69

Signed and sealed this 7th day of May 1974.

(SEAL)
Attest:

EDWARD M.FLETCHER,JR.
Attesting Officer

C. MARSHALL DANN
Commissioner of Patents